United States Patent
Garrett et al.

(10) Patent No.: US 9,689,274 B2
(45) Date of Patent: *Jun. 27, 2017

(54) VARIABLE GEOMETRY TURBINE

(71) Applicant: Cummins Turbo Technologies Limited, Huddersfield (GB)

(72) Inventors: Stephen Garrett, Huddersfield (GB); John F. Parker, Huddersfield (GB)

(73) Assignee: CUMMINS TURBO TECHNOLOGIES LIMITED, Huddersfield (GB)

(*) Notice: Subject to any disclaimer, the term of this patent is extended or adjusted under 35 U.S.C. 154(b) by 635 days.

This patent is subject to a terminal disclaimer.

(21) Appl. No.: 14/105,604

(22) Filed: Dec. 13, 2013

(65) Prior Publication Data

US 2014/0147255 A1    May 29, 2014

Related U.S. Application Data

(63) Continuation of application No. 12/936,134, filed as application No. PCT/GB2009/000710 on Mar. 17, 2009, now Pat. No. 8,608,434.

(30) Foreign Application Priority Data

Apr. 1, 2008  (GB) .................................. 0805880.2
Jan. 13, 2009 (GB) .................................. 0900448.2

(51) Int. Cl.
*F01D 17/16*  (2006.01)
*F01D 17/14*  (2006.01)
*F02C 6/12*  (2006.01)

(52) U.S. Cl.
CPC ........... *F01D 17/16* (2013.01); *F01D 17/143* (2013.01); *F02C 6/12* (2013.01); *F05D 2220/40* (2013.01); *F05D 2230/642* (2013.01)

(58) Field of Classification Search
CPC ........ F01D 17/143; F01D 17/14; F01D 17/16; F01D 17/141; F01D 17/165; F01D 17/167

See application file for complete search history.

(56) References Cited

U.S. PATENT DOCUMENTS 2,846,185 A * 8/1958 Widmer .................... F03B 1/00
                                                         415/150
4,403,914 A    9/1983 Rogo et al.
(Continued)

FOREIGN PATENT DOCUMENTS

DE    4218229 C1   3/1993
EP    0342889 A1   11/1989
EP    0917618 B1   3/2004

OTHER PUBLICATIONS

International Search Report and Written Opinion, Cummins Turbo Technologies Limited, PCT/GB2009/000710, Jun. 24, 2009.
(Continued)

*Primary Examiner* — Igor Kershteyn
*Assistant Examiner* — Justin Seabe
(74) *Attorney, Agent, or Firm* — Taft Stettinius & Hollister LLP

(57) ABSTRACT

A variable geometry turbine comprises: a turbine wheel in a housing assembly defining a radial gas flow inlet passage; an annular wall member which is displaceable to control gas flow through the inlet passage; and a linkage mechanism comprising at least one actuating member operably connected to the annular wall member to control displacement of the wall member. The actuating member has a terminal portion defining a radially extending flange and extends in a direction substantially parallel to the turbine axis through an aperture defined by a retaining member to locate the radially extending flange in between said retaining member and annular wall member. The terminal portion is contacted by (Continued)

the retaining member to connect the actuating member to the annular wall member. The aperture defines a clearance to accommodate displacement of the retaining member relative to the actuating member.

22 Claims, 5 Drawing Sheets

(56) References Cited

U.S. PATENT DOCUMENTS

| | | | | |
|---|---|---|---|---|
| 4,557,665 | A | 12/1985 | Szczupak | |
| 5,183,381 | A | 2/1993 | McKean | |
| 5,868,552 | A | 2/1999 | McKean et al. | |
| 6,019,574 | A * | 2/2000 | DiBella | F01D 17/162 |
| | | | | 415/148 |
| 6,401,563 | B1 * | 6/2002 | Franklin | F01D 17/143 |
| | | | | 403/113 |
| 7,207,176 | B2 * | 4/2007 | Mulloy | F01D 17/14 |
| | | | | 415/158 |
| 2008/0193281 | A1 | 8/2008 | Sausse et al. | |

OTHER PUBLICATIONS

United Kingdom Search Report, GB0805880.2, Cummins Turbo Technologies Limited, Jul. 25, 2008.
United Kingdom Search Report, GB0900448.2, Cummins Turbo Technologies Limited, Feb. 12, 2009.

* cited by examiner

VARIABLE GEOMETRY TURBINE

The present invention relates to a variable geometry turbine comprising a gas flow inlet control mechanism incorporating a linkage mechanism which can maintain connection between components of the gas flow control mechanism whilst accommodating differential expansion between the interconnected components.

Turbine components are exposed to a wide range of temperatures during operation. In certain circumstances, different components exhibit different rates of thermally induced expansion or contraction. This may be because the components possess different thermal expansion coefficients or because they are exposed to differing temperatures. A linkage between such components must ensure that the components remain operatively connected across the anticipated operating temperature range by accommodating any differential expansion or contraction between the connected components.

A conventional turbine essentially comprises an exhaust gas driven turbine wheel mounted on a rotatable shaft within a turbine housing connected downstream of an engine outlet manifold. Rotation of the turbine wheel drives either a compressor wheel mounted on the other end of the shaft within a compressor housing to deliver compressed air to the engine intake manifold, or a gear which transmits mechanical power to the engine flywheel or crankshaft. The turbine shaft is conventionally supported by journal and thrust bearings, including appropriate lubricating systems, located within a bearing housing.

In one known type of turbine, referred to as a variable geometry turbine, an axially moveable wall member, generally referred to as a "nozzle ring", defines one wall of the turbine inlet passageway. The position of the nozzle ring relative to a facing wall of the inlet passageway is adjustable to control the axial width of the inlet passageway. Thus, for example, as gas flows through the turbine decreases, the inlet passageway width may be decreased to maintain gas velocity and optimise turbine output. In this way, the displaceable nozzle ring is exposed to the hot exhaust gases used to drive the turbine. The bearing housing, however, is typically water-cooled and so the nozzle ring will generally reach a higher temperature than the housing and its temperature will also vary much more rapidly than that of the housing. As a result, the ring will expand and contract radially relative to the housing.

In one common arrangement of a variable geometry turbine the nozzle ring is supported on rods extending parallel to the axis of rotation of the turbine wheel and is moved by an actuator assembly which axially displaces the rods. Since the housing is provided with cooling, the spacing between the rods varies much less than the diameter of the ring to which the rods are connected in response to operating temperature changes. If the rods were securely fixed to the ring, this differential expansion could only be accommodated by mechanical distortion of the interconnected components, which is not acceptable.

In efforts to address this problem, variable geometry turbines have been developed in which the rods have been connected to the nozzle ring using a linkage mechanism which allows for limited relative movement in the radial direction. The allowed movement must be sufficient to accommodate the maximum expected differential expansion, but limited so that the mechanism is still able to position the ring accurately in the housing.

In addition to the operating requirements mentioned above, the interconnections between the ring and the rods must prevent excessive tilting of the ring relative to a plane perpendicular to the rods as this would affect the operating clearances of the linkage mechanism and thereby reduce performance. The ring must also be accurately positioned in the axial direction to ensure that the mechanism responds in a predictable manner to a control input. This means that the mechanism must have limited backlash to ensure proper operation and control. All this has to be achieved in a linkage mechanism that is robust enough to last for several thousands of hours running in the corrosive exhaust gas of an engine, at high temperatures, with no lubrication and in conditions in which mechanical vibration of the interconnected components is inevitable. Such performance has proved difficult to achieve.

An example of a linkage mechanism which has gone someway to meeting the above requirements is described in European patent no. EP0917618B1. This patent relates to a linkage mechanism suitable to link actuator rods to the nozzle ring of a variable geometry turbine, which can accommodate differential expansion of the nozzle ring compared to the actuator rods. The ring supports a limiting stop and a cylindrical pivot for connection to each rod. A transverse elongate element is secured to one end of each rod and defines a pair of bores arranged to be aligned with the stop and pivot. The stop and pivot are secured to the ring by washers and rivets, with the transverse element retained between the ring and the washers. The pivot is a close fit in its respective bore, whereas the stop is a loose fit in its bore. Accordingly the transverse element can rotate on the pivot to an extent determined by the clearance between the stop and the wall of its bore when, during operation, the ring expands more than the housing supporting the rods. Thus, increased radial expansion of the ring as compared to the rods is accommodated by each transverse element pivoting radially inwardly.

The arrangement described in EP0917618B1 represented a significant improvement over existing linkage mechanisms, particularly those used to link actuator rods to the nozzle rings of turbochargers. Experience has shown, however, that due to the extreme operating conditions experienced by turbocharger components the washers, stops and pivots must be manufactured from relatively costly, high performance materials. Moreover, the bores defined by the transverse element must be ground precisely to an appropriate dimension not only for close fitting to the pivot but also to ensure that a sufficiently large clearance is defined between the stop and its respective bore to permit adequate inwards pivoting of the transverse element during anticipated operating conditions. This generally leaves little thickness of material in the walls surrounding each bore which consequently raises the manufacturing cost of the transverse elements.

It is an object of the present invention to obviate or mitigate one or more of the problems with existing linkage mechanisms set out above.

According to the present invention there is provided variable geometry turbine comprising:
  a turbine wheel mounted on a turbine shaft within a housing assembly for rotation about a turbine axis, said housing assembly defining a radial gas flow inlet passage upstream of said turbine wheel;
  an annular wall member defining one wall of said inlet passage and which is displaceable in a direction substantially parallel to said turbine axis to control gas flow through the inlet passage; and a linkage mechanism comprising at least one actuating member operably connected to said annular wall member to control displacement of said wall member, wherein said actuating member has a terminal portion that defines a radially extending flange, and said actuating member extends in a direction substantially parallel to said turbine axis through an aperture defined by a retaining member such that said radially extending flange is located in between said retaining member and said annular wall member, said terminal portion of the actuating member defining a first bearing surface extending transverse to said turbine axis, said first bearing surface being contacted by a surface of the retaining member so as to connect the actuating member to the annular wall member, said aperture being dimensioned to define a clearance between a wall of said aperture and a portion of the actuating member located within said aperture In this way, the clearance can accommodate displacement of the retaining member, for example resulting from displacement of the annular wall member, relative to the actuating member, whilst ensuring the actuating member and annular wall member remain operatively connected.

It is preferred that the clearance extends in a first, preferably radial, direction transverse to the turbine axis. This allows displacement of the retaining member relative to the actuating member to be accommodated in a transverse, most preferably radial, direction relative to the turbine axis. Preferably the first direction is substantially perpendicular to the turbine axis.

The first bearing surface is preferably contacted by the surface of the retaining member so as to retain the actuating member against the annular wall member.

The first bearing surface of the actuating member is defined by a terminal portion of the actuating member which is located between the retaining member and the annular wall member. The first bearing surface preferably lies in a plane that is substantially perpendicular to the turbine axis. The terminal portion of the actuating member may define a second transverse bearing surface located opposite to the first bearing surface such that the second bearing surface contacts the annular wall member. The second bearing surface preferably extends radially relative to the turbine axis. The second bearing surface may lie in a plane which is substantially perpendicular to the turbine axis, and is preferably substantially parallel to the first bearing surface. The first bearing surface preferably faces away from the annular wall member and the second bearing surface faces towards the annular wall member. In this way, the first bearing surface may be considered as being located distally relative to the annular wall member and the second bearing surface may be considered as being located proximate to the annular wall member.

In a preferred embodiment the terminal portion of the actuating member defines a third bearing surface extending substantially parallel to a diameter of said turbine shaft and said third bearing surface is configured to contact a complementary bearing surface defined by the retaining member. The actuating member preferably defines at least two of said third bearing surfaces, each of which is arranged to contact a complementary bearing surface defined by the retaining member. Where two of said third bearing surfaces are provided they may be defined on opposite sides of the terminal portion of the actuating member, preferably interconnecting said first and second bearing surfaces. The or each of said third bearing surfaces may extend in a direction that is substantially parallel to said turbine axis as well as extending transverse, more preferably in a substantially perpendicular direction, relative to said turbine axis. Each of said third bearing surfaces thus provides a means to carry a load directed transverse to said third bearing surface, such as a torque or radial force applied by the turbine during operation.

The terminal portion of the actuating member defines a radially extending flange located in between said retaining member and said annular wall member. The flange, which extends transverse to the turbine axis, preferably defines a radial bearing surface facing towards the annular wall member which contacts a complementary bearing surface defined by the retaining member which faces away from the annular wall member. By appropriately spacing the annular flange of the or each actuating member from its respective first bearing surface so that their axial spacing substantially matches the axial thickness of the retaining member, the or each actuating member can be securely supported against the retaining member(s). In preferred embodiments where the or each retaining member is connected directly to the annular wall member, providing a means by which the actuating member(s) can be secured to the retaining member(s) thereby provides a means for connecting the actuating member(s) to the annular wall member without having to necessarily bring the actuating member(s) into direct contact with the annular wall member. While certain preferred embodiments described above mention the possibility of employing actuating members with terminal portions defining second bearing surfaces designed to contact a rear surface of the annular wall member (a surface facing away from the inlet passage and towards the housing assembly) it will be appreciated that if an arrangement is adopted as described here in which the actuating member(s) is (are) secured to the retaining member(s) which are in turn attached to the annular wall member then this removes the requirement for the actuating member(s) to directly contact the annular wall member, although it should be understood that this arrangement can still be adopted with actuating members defining second bearing surfaces intended to contact the rear surface of the annular wall member.

It is preferred that a further wall of the aperture in the retaining member defines a bearing surface extending substantially parallel to a diameter of said turbine shaft which is configured to contact a complementary fourth bearing surface defined by the portion of the actuating member located within the aperture, said fourth bearing surface thus extending in a direction that is substantially parallel to a diameter of said turbine shaft. The actuating member may define one or more fourth bearing surface arranged so as to contact a respective complementary further bearing surface defined by the aperture wall. Preferably the or each fourth bearing surface is arranged so as to carry torque or radial forces applied to the linkage mechanism by the turbine. In this way, the or each fourth bearing surface can supplement or substitute one or more of the third bearing surfaces defined by the terminal portion of the actuating member.

The aperture defined by the retaining member is preferably at least partially bounded by the surface of the retaining member which contacts the first bearing surface of the actuating member. The aperture may be completely bounded by said surface of the retaining member, or only partially bounded by said surface such that the aperture forms part of a slot. The slot may extend substantially parallel to a diameter of said turbine shaft, or may define a first portion which extends over an arc having a curvature that is at least similar to the curvature of the annular wall member, in which case the slot optionally further defines a second portion which extends substantially parallel to a diameter of said turbine shaft. The portion of the actuating member that is located within said aperture preferably resides within said second portion of the slot. The slot preferably extends through an edge of the retaining member to ease location of the actuating member in the aperture. Additionally or alternatively, the slot may define an enlarged portion of sufficient cross sectional area to enable the terminal portion of the actuating member to be inserted axially in between the retaining member and the annular wall member. Following insertion, the actuating member may then be slid into place so as to reside in the correct position during use of the turbine. An exemplary embodiment of such an arrangement is described below with reference to FIGS. 4 to 7. In a still further embodiment, the slot may extend through the side of the retaining member and also, optionally, a radially inner axially extending flange defined by the annular wall member. Such an arrangement facilitates insertion of the or each actuating member by positioning each actuating member inside a central opening defined by the annular wall member and then sliding each actuating member radially outwardly so that the terminal portion of each member passes through a respective hole in the inner flange of the annular wall member and along its respective slot defined by the retaining member(s).

Preferably the surface of the retaining member which contacts the first bearing surface of the actuating member extends transverse, more preferably in a substantially perpendicular direction, relative to the turbine axis. Said surface of the retaining member and the first bearing surface of the actuating member are preferably complementary and may each be generally planar.

The retaining member may be of any desirable size and/or shape to suit a particular application. Moreover, any appropriate number of retaining members may be used. For example, in certain applications, a single retaining member may be appropriate, while in other applications, two, three or more separate retaining members may be more suitable. In a preferred embodiment, the retaining member defines an arcuate plate having a curvature that is similar to, or more preferably substantially matches, the curvature of the annular wall member. The retaining member may define at least one bore for receipt of any appropriate type of fastener, such as a rivet or the like, to secure a contact surface of the retaining member to the annular wall member. The or each bore preferably extends substantially parallel to said turbine axis. In a preferred embodiment the retaining member defines first and second bores, the first bore defined in a first contact surface provided on one side of the aperture through which the actuating member extends and the second bore defined in a second contact surface provided on the opposite side of the aperture. The first and second contact surfaces of the retaining member are preferably substantially coplanar and lie in planes which are substantially perpendicular to said turbine axis. Moreover, the or each contact surface of the retaining member may extend in a direction which is preferably generally parallel to the surface of the retaining member which contacts the first bearing surface of the actuating member. In an alternative preferred embodiment, the retaining member is a substantially annular plate attached to axially extending radially inner and outer flanges defined by the annular wall member. While again, any desirable number of such annular plates may be used, in this embodiment it is envisaged that a single annular wall member may be most appropriate in most applications. In this case, it is preferred that the annular plate corresponds in curvature and radial thickness to the front radial face of the annular wall member that faces into the turbine inlet passage such that the retaining member in the form of an annular plate substantially closes the rear face of the annular wall member (i.e. the face that faces the housing assembly) save for the slots/apertures through which the actuating member (s) extend.

Preferably the actuating member is an elongate pushrod which is axially displaceable along an axis that is substantially parallel, and preferably radially displaced from, said turbine axis. The terminal portion of the actuating member may comprise an enlarged head portion which extends radially outwardly from an end of the axially displaceable pushrod. While the head portion may take any desirable symmetrical or asymmetrical cross sectional form, such as a circular or oval cross section, it is preferred that the terminal portion defines a square or rectangular cross section.

It is preferred that the housing assembly forming part of the turbine of the present invention defines an annular radial gas flow inlet which is directed upstream of the turbine and that said annular wall member defines one wall of said inlet. Preferably the turbine is in the form of a variable geometry turbocharger and additionally comprises a compressor wheel mounted on the turbine shaft, the compressor wheel being driven by rotation of the shaft as a result of rotation of the turbine. The compressor wheel can thus be used to compress atmospheric air and deliver said air at above atmospheric pressure via a radial gas flow outlet defined by a compressor housing assembly to an engine intake manifold. Alternatively, the turbine shaft may be connected to a gear, in place of the compressor, to transmit mechanical power to an engine flywheel or crankshaft.

Moreover, it is preferred that the annular wall member supports a plurality of axially extending stators arranged to deflect gas flowing through the inlet passage so that the gas is flowing in the correct direction to drive the turbine wheel most efficiently. The turbine preferably further comprises an annular shroud plate located within the turbine housing and which defines a plurality of slots that are suitably arranged to receive the stators defined by the annular wall member. The shroud plate is preferably fixed such that axial displacement of the annular wall member relative to the shroud plate is achieved solely by axial displacement of the annular wall member.

The retaining member employed in the linkage is preferably a separate component to the actuating member, which is a fundamentally different arrangement to that described in EP0917618B1 which employed conventional rivets received in bores defined by an integral part of the actuating member.

It will be appreciated that the linkage mechanism of the present invention is eminently suitable for use in a wide range of applications where a linkage is required between components where one component is likely to be displaced relative either to the other component or an element of the linkage itself during operation.

Other advantageous and preferred features of the invention will be apparent from the following description.

Specific embodiments of the present invention will now be described, by way of example only, with reference to the accompanying drawings, in which.

Figure 1:
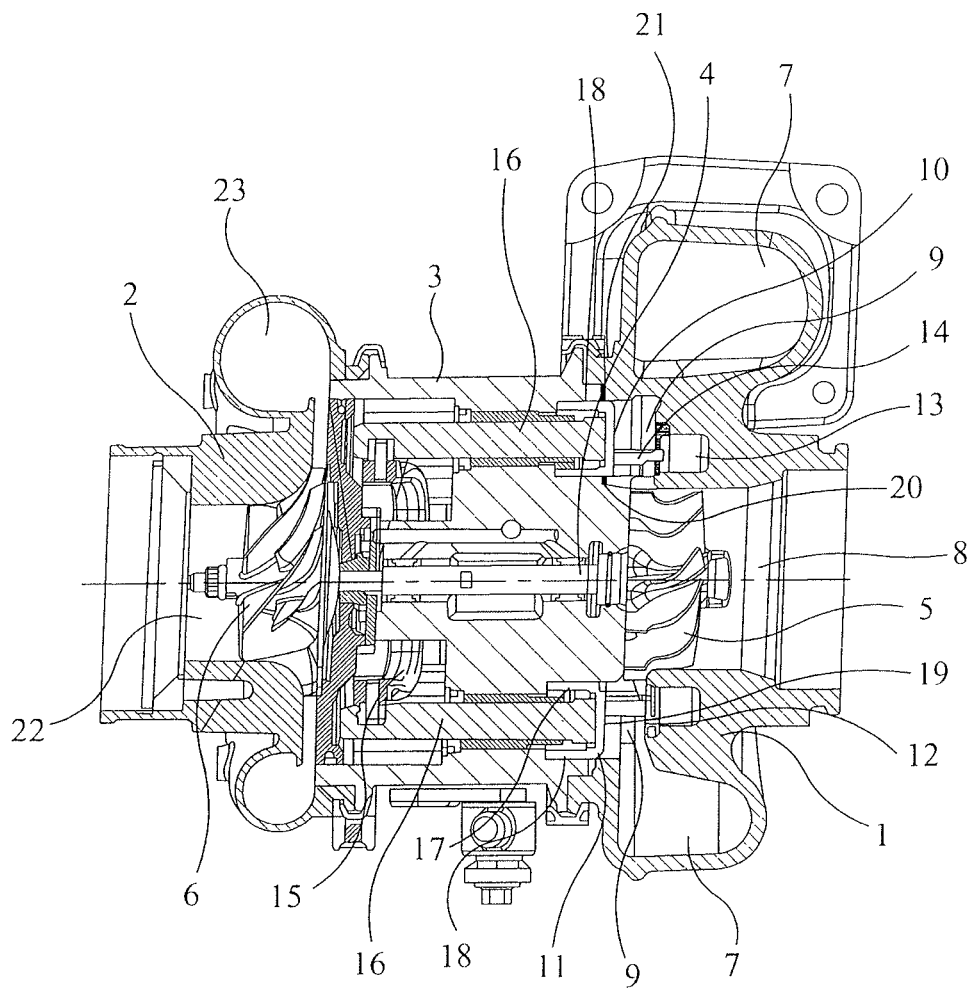
FIG. 1 is an axial cross-section through a known variable geometry turbocharger.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face 10 of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled. The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
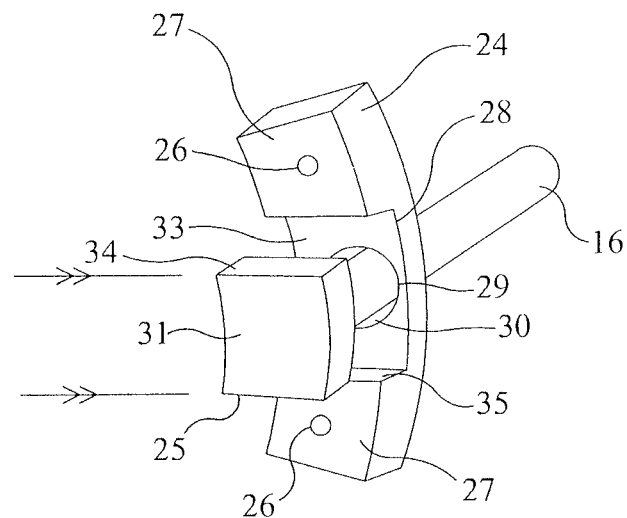
FIG. 2 is an enlarged perspective view of a linkage mechanism which is suitable to link the nozzle ring to the nozzle ring actuating rods of a variable geometry turbocharger according to a first embodiment of the present invention of FIG. 1.

Referring to FIG. 2, this illustrates a first embodiment of a linkage which can be employed to interconnect the nozzle ring 11 and the actuator rods 16 of FIG. 1. Although not shown in FIG. 2, each of the rods 16 defines a notch at its distal end, opposite to the end contacting the nozzle ring 11, in which a respective one of the ends of the yoke 15 of FIG. 1 engages to axially displace the rods 16 and thereby the nozzle ring 11. FIG. 2 shows only one actuator rod 16 and its associated retaining member 24 from the side of the actuator rod linkage which faces the nozzle ring 11.

The retaining member 24 and a proximal end 25 of the actuating rod 16 are arranged to contact an inwardly extending radial flange (not shown) of the nozzle ring 11 which is defined between the axially extending radially inner and outer annular flanges 17 and 18 of the ring 11. The retaining member 24 has a curvature matching that of the nozzle ring 11 and defines a pair of bores 26 at its ends which receive rivets (not shown) to fixedly connect the retaining member 24 to the radial flange of the nozzle ring 11. The bores 26 extend through a pair of substantially parallel generally planar contact surfaces 27 which are held against the inwardly extending radial flange of the nozzle ring 11 by the rivets. The relatively large area over which contact surfaces 27 abut the radial flange of the nozzle ring 11 is advantageous in that it provides a large area to accommodate forces resulting from fastening the retaining member 24 to the nozzle ring 11.

The retaining member 24 is provided with a thinned centre portion 28, interposed between the pair of contact surfaces 27, which is appropriately dimensioned to receive the proximal end 25 of the rod 16. The centre portion 28 of the retaining member 24 also defines a central aperture 29 for receipt of the actuating rod 16 in such a manner that the proximal end 25 of the actuating rod 16 is located closer to the nozzle ring 11 in an axial direction than the centre portion 28 of the retaining member 24. In this way, the centre portion 28 of the retaining member 24 overlies the proximal end 25 of the rod 16 when the retaining member 24 is riveted to the radial flange of the nozzle ring 11 and thereby retains the rod 16 against the nozzle ring 11.

The inner cross sectional diameter of the aperture 29 defined by the retaining member 24 is slightly larger than the outer cross sectional diameter of the rod 16 so as to define a clearance 30 between the aperture 29 and the rod 16 which can accommodate radial displacement of the retaining member 24 relative to the rod 16. It will be appreciated that the extent to which such radial displacement can be tolerated is determined by the dimensions of the clearance 30. An advantage of this arrangement is that the rod 16 is not caused to rotate about its long axis during radial displacement of the ring 11 relative to the rod 16. As such rotational movement of the rod 16 can now be avoided this enables the use of more simple methods for connecting each rod 16 to the yoke 15 of the actuator output shaft and overcomes problems related to the connection between the rods 16 and the yoke 15.

A relatively large radially extending proximal face 31 (also referred to herein as a "second" bearing surface) of the proximal end 25 of the rod 16 bears against the radial flange of the nozzle ring 11 so as to define a significant bearing area between the components, which will limit wear between the contacting surfaces. Similarly, a radially extending distal face 32 (also referred to herein as a "first" bearing surface) of the proximal end 25 of the rod 16 defines a large area for contacting a proximal surface 33 of the centre portion 28 of the retaining member 24. This interaction provides a relatively large bearing area to transmit axial forces during retraction of the rod 16 towards the compressor housing 2. This area is significantly greater than the bearing area defined between the transverse member and the washers of the linkage mechanism described in EP0917618B1.

The proximal end 25 of the rod 16 defines a pair of opposite axially extending surfaces 34 (also referred to herein as "third" bearing surfaces), each of which is located adjacent to a substantially parallel axially extending surface 35 (also referred to herein as a "complementary" bearing surface) of the retaining member 24. Each surface 34, 35 also extends substantially parallel to a diameter of the turbine shaft. It will be appreciated that the axially extending nature of the surfaces 35 of the retaining member 24 define the thinned centre portion 28 of the retaining member 24. Each pair of opposed parallel surfaces 34, 35 defines a relatively large bearing area to carry the torsional loads on the nozzle ring 11 that result from acceleration of the exhaust gas flowing across the face of the nozzle ring 11. It will be appreciated that these bearing areas are significantly larger than those defined between the transverse member and the pivot/stop of the linkage described in EP0917618B1. A further benefit of the provision of the pairs of opposed parallel surfaces 34, 35 is to provide a further means by which radial expansion of the nozzle ring 11 relative to the actuator rod 16 can be accommodated. As such expansion occurs, each axially extending surface 35 of the retaining member 24 slides over the adjacent axially extending surface 34 of the proximal end 25 of the rod 16. Another advantage of the nature of the surfaces 34, 35 is that they prevent axial rotation of the rod 16, which, as mentioned above, enables the use of more simple methods for connecting each rod 16 to the yoke 15 of the actuator output shaft and overcomes potential problems relating to the connection of the yoke 15 to the rods 16.

Figure 3:
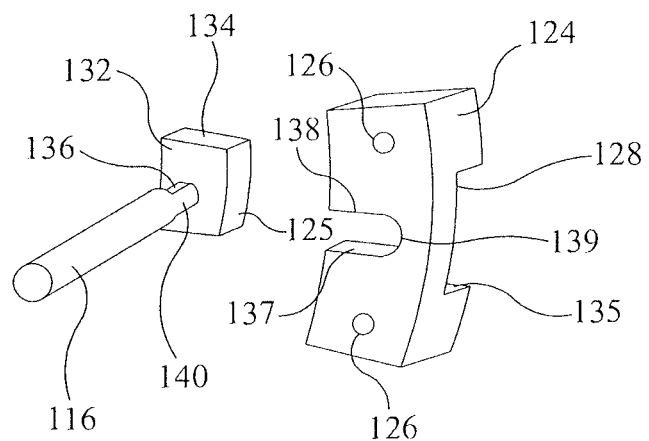
FIG. 3 is an enlarged perspective view of a linkage mechanism which is suitable to link the nozzle ring to the nozzle ring actuating rods of a variable geometry turbocharger according to a second embodiment of the present invention of FIG. 1.
Figure 4:
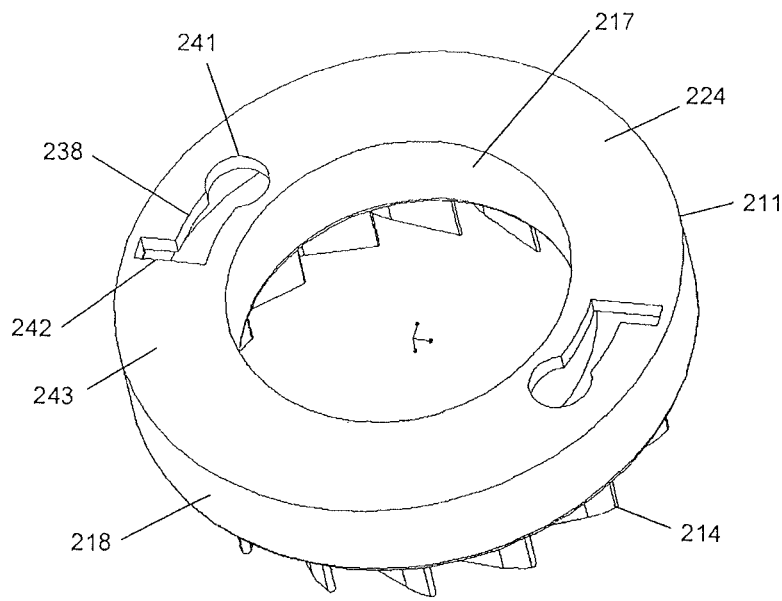
FIG. 4 is a perspective view of the rear of a nozzle ring defining an integral retaining member for use in combination with nozzle ring actuating rods of a variable geometry turbocharger according to a third embodiment of the present invention of FIG. 1.

Referring now to FIG. 3, a second embodiment of the linkage mechanism of the present invention is shown. The linkage shown in FIG. 3 shares many features with the linkage described above in relation to FIG. 2. Accordingly, like parts will take the same reference number as in FIG. 2, but increased by 100. Only those aspects of the linkage of FIG. 3 which differ from FIG. 2 will be described in detail.

In FIG. 3, a retaining member 124 is provided with a thinned centre portion 128 of suitable dimension to receive a proximal end 125 of an actuating rod 116. The retaining member 124 is provided with a pair of bores 126 near its ends to allow the retaining member 124 to be secured to the radial flange of a nozzle ring 11 of the kind depicted in FIG. 1 using fasteners, such as rivets, in the same manner as the retaining member 24 of FIG. 2.

The retaining member 124 and proximal end 125 of the rod 116 define parallel axially extending surfaces 134, 135 respectively which are located adjacent to one another and provide relatively large bearing areas to carry torsional loads on the nozzle ring 11. In the second embodiment of the present invention shown in FIG. 3, a region of the rod 116 next to the proximal end 125 of the rod 116 defines a pair of axially extending surfaces 136 (also referred to herein as "fourth" bearing surfaces) which are arranged to bear against a pair of complementary parallel axially extending surfaces 137 defined by the retaining member 124. These bearing surfaces 136, 137 provide an additional means by which torsional loads on the nozzle ring 11 can be carried. The surfaces 137 define a slot 138 extending from one side to the centre of the retaining member 124 and which terminates in an arcuate wall 139 whose curvature matches that of curved sections 140 of the rod 116 between the axially extending surfaces 136. The slot 138 and rod 116 are suitably dimensioned to define a clearance when the rod 116 is received within the slot 138 which can accommodate radial displacement of the ring 11 relative to the rod 116 resulting from differential thermal expansion or contraction during operation of the turbocharger.

Referring now to FIGS. 4 to 7, there are shown components of a third embodiment of the linkage mechanism of the present invention. The linkage described in relation to FIGS. 4 to 7 shares many features with the linkages described above in connection with FIGS. 2 and 3. As such, like parts will take the same reference numbers as in FIG. 2, but increased by 200. Only those aspects of the linkage of FIGS. 4 to 7 which differ from FIGS. 2 and 3 will be described in detail below. The most fundamental difference is in the form of the retaining member 224 and the way in which it is attached to the nozzle ring 211, which necessitates a slight change to the construction of the actuator rods 216 and the way in which they are connected to the nozzle ring 211. In the embodiment shown in FIGS. 4 to 7, the retaining member 224 takes the form of an annular plate which is attached by welding or the like to the radially inner and outer axially extending flanges 217, 218 defined by the nozzle ring 211. In this way, the retaining member 224 closes the face of the nozzle ring 211 which faces away from the turbine inlet passageway 9 during use.

Figure 5:
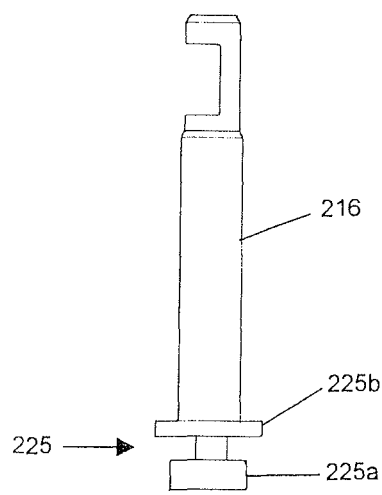
FIG. 5 is a side view of a nozzle ring actuating rod for use with the nozzle ring of FIG. 4.
Figure 6:
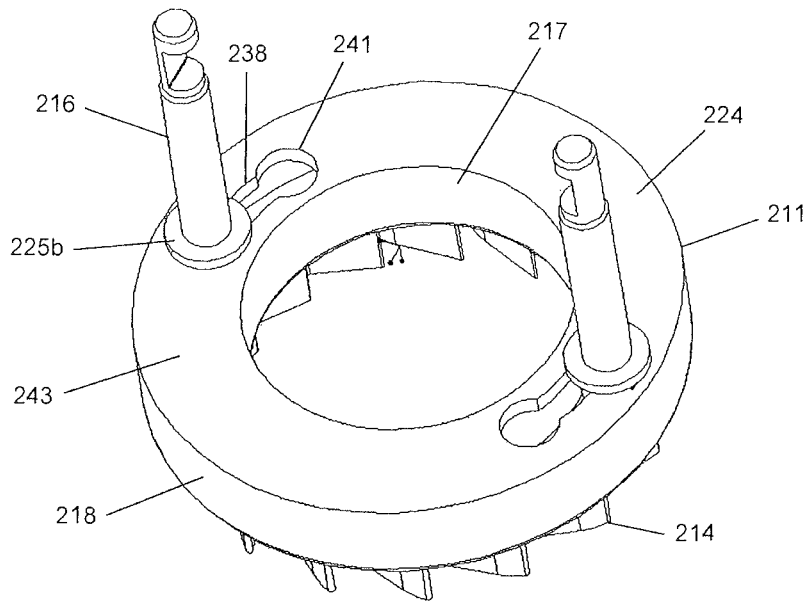
FIG. 6 is a perspective view of the nozzle ring of FIG. 4 with two actuating rods of the kind depicted in FIG. 4 connected.
Figure 7:
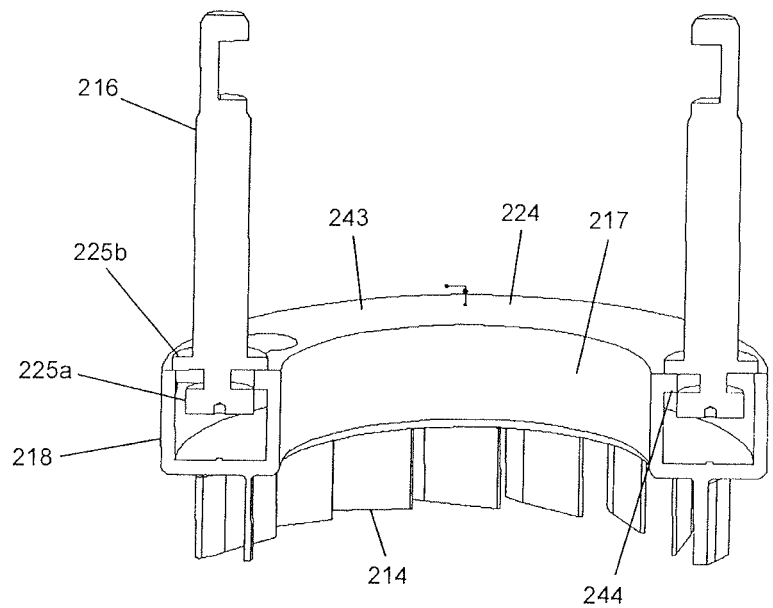
FIG. 7 is a perspective cross-sectional view of the nozzle ring/actuator rod assembly of FIG. 6.

The retaining member 224 defines a pair of curved slots 238, each of which terminates at one end with a substantially circular aperture 241 and at the opposite end with a radially extending linear slot 242. The size and shape of the slots 238, 242 and apertures 241 have been designed to be used with actuating rods 216 of the kind depicted in FIG. 5. The manner in which these components interact can be discerned from FIGS. 6 and 7. As can be seen in FIG. 5, the terminal portion 225 of each actuating rod 216 defines a first enlarged head portion 225a and a second radially extending flange 225b. The diameter of the head portion 225a of each actuating rod 216 is less than that of each circular aperture 241 defined by the retaining member 224, but the diameter of each flange 225*b* is larger than that of each aperture 241. In this way, an actuating rod 216 can be inserted into each slot 238 via its respective circular aperture 241 with the enlarged head portion 225*a* residing in between the retaining member 224 and the annular wall member 211 and leaving the flange 225*b* located to the rear of the retaining member 224. Each actuating rod 216 is then slid to the opposite end of its respective curved slot 238 until it resides within the linear radially extending slot 242 at which point it is then slid radially outwardly. At this point, each rod 216 may then be fixed in position using any appropriate means, or the closeness of the fit of each rod 216 within its respective slot 238 may be sufficient to retain it in place during operation of the turbine. In either case, each radial slot 242 is dimensioned to leave a small clearance of sufficient size to accommodate differential radial expansion between the retaining member 224 and each rod 216 for the reasons explained more fully above in respect of the first and second embodiments of the present invention.

In the third exemplary embodiment shown in FIGS. 4 to 7, the axial spacing between the head portion 225*a* and flange 225*b* approximates the axial thickness of the retaining member 224. In this way, once the head portion 225*a* has been inserted through the circular aperture 241 the flange 225*b* contacts a rear surface 243 of the retaining member 224. Axial movement of the actuating rods 216 to move the nozzle ring 211 into the passageway 9 is thereby transmitted from the actuator rods 216 to the nozzle ring 211 via contact between the flange 225*b* of each rod 216 and the rear surface 243 of the retaining member 224. Axial movement in the opposite direction is achieved via transmission of the requisite force from the enlarged head portion 225*a* of each rod 216 to a front surface 244 of the retaining member 224.

Figure 8:
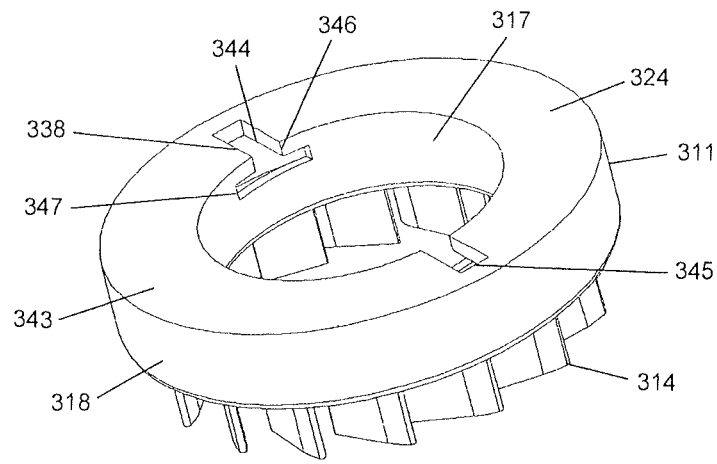
FIG. 8 is a perspective view of the rear of a nozzle ring defining an integral retaining member for use in combination with nozzle ring actuating rods of a variable geometry turbocharger according to a fourth embodiment of the present invention of FIG. 1.
Figure 9:
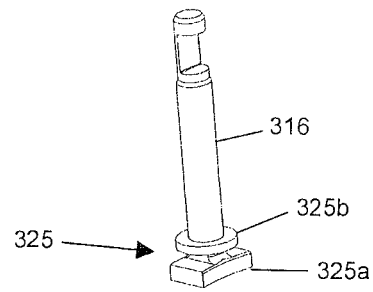
FIG. 9 is a perspective view of a nozzle ring actuating rod for use with the nozzle ring of FIG. 8.
Figure 10:
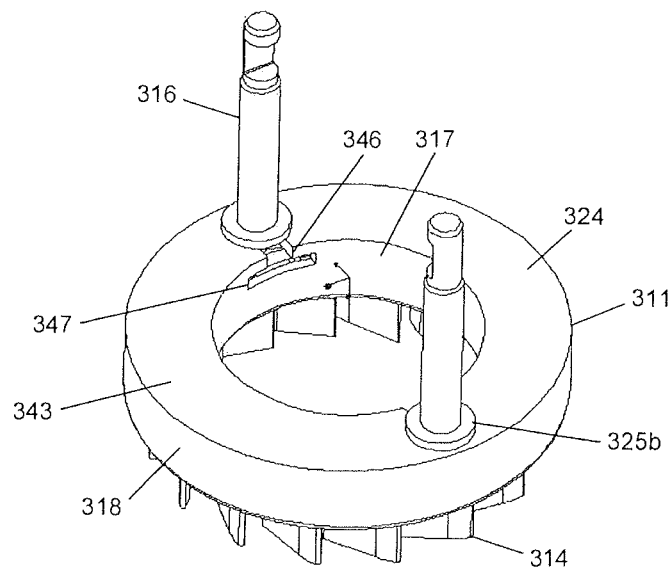
FIG. 10 is a perspective view of the nozzle ring of FIG. 8 with two actuating rods of the kind depicted in FIG. 9 connected.

Now referring to FIGS. 8 to 10, there are shown components of a fourth embodiment of the linkage mechanism of the present invention, which again shares many features with the linkages described above in connection with FIGS. 2 and 3 and, in particular, FIGS. 4 to 7. As such, like parts will take the same reference numbers as in FIG. 2, but increased by 300. Only those features of the linkage of FIGS. 8 to 10 which differ from FIGS. 2 and 3 will be described in detail. It will be evident from a comparison of the present embodiment shown in FIGS. 8 to 10 to the third embodiment shown in FIGS. 4 to 7, that the present embodiment, like the third embodiment, incorporates a retaining member 324 which is generally in the form of an annular plate attached by welding or the like to the radially inner and outer axially extending flanges 317, 318 defined by the nozzle ring 311. Thus, the retaining member 324 closes the face of the nozzle ring 311 which faces away from the turbine inlet passageway 9 during use in a similar manner to the retaining member 224 employed in the third embodiment.

A fundamental difference between the third and fourth embodiments is the form of the slots 338 in which the actuating rods 316 are located and, as a result, the form of the terminal end portion 325 of each rod 316. In the fourth embodiment, the retaining member 324 defines a pair of diametrically opposite radially extending linear slots 338, each of which terminates at a radially outer end with a straight edge 345 and at a radially inner end with an opening 346 which extends through the radially inner flange 317. Each opening 346 extends axially through the inner flange 317 to define a further slot 347 extending laterally of its respective radial slot 338 part way around the inner flange 317. The size and shape of the slots 338, 347 and openings 346 are arranged to enable actuating rods 316 to be inserted into the slots 338 of the retaining member 324 from the centre of the nozzle ring 311 by simply sliding each rod 316 radially outwards, whereupon each rod can then be fixedly attached to the retaining member 324 using any appropriate means of connection, such as brazing, welding or, in some applications, friction alone.

The terminal portion 325 of each actuating rod 316 is adapted for use with the particular arrangement of slots 338, 347 and openings 346 described above. The terminal portion 325 of each rod 316 defines a first enlarged head portion 325*a* and a second radially extending flange 325*b*. The size and shape of the head portion 325*a* of each rod 316 is similar to or less than the size and shape of each slot 347 defined by the radially inner flange 317 to enable the head portion 325*a* of each rod 316 to pass through its respective slot 347. The diameter of each flange 325*b* is larger than the width of each slot 338 such that, following insertion of a rod 316 into its respective slot 338 via its respective opening 347, its head portion 325*a* resides in between the retaining member 324 and the nozzle ring 311 and the flange 325*b* is located behind the retaining member 324 (i.e. facing away from the inlet passageway 9 of the turbine—not shown in FIGS. 8 to 10). Each radial slot 338 is dimensioned to define a small clearance of sufficient size to accommodate differential radial expansion between the retaining member 324 and each rod 316 for the reasons explained more fully above in respect of the first and second embodiments of the present invention.

In the fourth embodiment shown in FIGS. 8 to 10, the axial spacing between the head portion 325*a* and flange 325*b* of each actuating rod 316 is similar to the axial thickness of the retaining member 324 in a similar way to the third embodiment described above. As before therefore, once the head portion 325*a* of each rod 316 has been inserted through its respective opening 347 and slid radially outwards along its slot 338, the flange 325*b* contacts a rear surface 343 of the retaining member 324 such that axial movement of the rods 316 to move the nozzle ring 311 into the passageway 9 is transmitted from the rods 316 to the nozzle ring 311 via contact between the flange 325*b* of each rod 316 and the rear surface 343 of the retaining member 324, while axial movement in the opposite direction is achieved via transmission of force from the enlarged head portion 325*a* of each rod 316 to a front surface 344 of the retaining member 324.

In all of the embodiments of the linkage mechanism described above it will be evident that neither arrangement requires the use of spacers, washers or the like, which have caused problems in earlier linkages of this kind. Moreover, the bores 26, 126 provided in the retaining members 24, 124 according to the first and second embodiments do not need to be ground, thereby reducing costs, and the thin walls surrounding the corresponding bores in the linkage described in EP0917618B1 are replaced with significantly thicker sections of material, making these areas much less prone to cracking and therefore stronger and more durable.

The retaining members 24, 124, 224, 324 employed in all of the above embodiments may be manufactured from any appropriate material using any convenient method, although it is envisaged that powder metal or investment casting methods may be particularly suitable. Additionally, the actuating rods 16, 116, 216, 316 used in each of the four embodiments may be manufactured from any appropriate material in any desirable way, such as forging or casting. Moreover, the actuating rods 16, 116 used in the first and second embodiments define proximal ends 25, 125 that are substantially square cuboid in shape, with generally square proximal and distal faces 31, 131 and 32, 132 interconnected by substantially rectangular edges (two of which represent the axially extending bearing surfaces 34, 134. It will however, be appreciated that the proximal end 25, 125 of each rod 16, 116 may take any appropriate shape provided it defines a radially outwardly extending portion which can be contacted by a complementary portion of the retaining member 24, 124 so as to retain the radially outwardly extending portion between the retaining member 24, 124 and the nozzle ring 11. By way of example, each rod 16, 116 may have a proximal end 25, 125 which defines a substantially circular or oval cross section. Moreover, it is envisaged that each rod 16, 116 may define two or more spaced proximal end portions designed to contact the nozzle ring, which are separated by a predetermined distance so as to define a recess or channel for receipt of a centrally located guide member. The guide member would define a pair of opposite edges arranged to cooperate with complementary parallel edges of the proximal end portions located to either side of the central guide. Furthermore, the terminal end portions 225, 325 of the actuating members 216, 316 used in the third and fourth embodiments may incorporate enlarged head portions 225a, 325a and/or flanges 225b, 325b of any desirable size and shape provided they can perform in the same functional manner as the specific embodiments described above in relation to FIGS. 5 to 7, 9 and 10.

Where the linkage of the present invention is employed in a system incorporating two or more rods, it will be appreciated that one of the rods may be connected using a linkage as described above in relation to any of the four embodiments described above, and at least one further rod could employ a different type of linkage, such as a linkage of the kind described in EP0917618B1 or one which provides only for pivotal movement of the ring about a single bearing. By way of a further example, a first rod could employ a linkage according to the embodiment shown in FIG. 2 and a second rod could employ a linkage according to the embodiment shown in FIG. 3. Moreover, three or more linkages could be used, at least one according to an embodiment of the present invention, whereby the linkages would prevent any displacement of the axis of the nozzle ring in a transverse direction.

Although the illustrated embodiments of the present invention interconnects a nozzle ring and axially displaceable pushrods of a turbocharger, it will be appreciated that the linkage mechanism of the present invention is eminently suitable for use in many other applications, such as circumstances where an annular member was to be connected to fixed rods or the like.

The invention claimed is:

1. A variable geometry turbine comprising:
a turbine wheel mounted on a turbine shaft within a housing assembly for rotation about a turbine axis, said housing assembly defining a radial gas flow inlet passage upstream of said turbine wheel;
an annular wall member defining one wall of said inlet passage and which is displaceable in a direction substantially parallel to said turbine axis to control gas flow through the inlet passage; and
a linkage mechanism comprising at least one actuating member operably connected to said annular wall member to control displacement of said wall member,
wherein said actuating member has a terminal portion that defines a radially extending flange, and said actuating member extends in a direction substantially parallel to said turbine axis through an aperture defined by a retaining member such that said radially extending flange is located in between said retaining member and said annular wall member,
said radially extending flanges of said terminal portion of the actuating member defining a first bearing surface extending transverse to said turbine axis, said first bearing surface being contacted by a surface of the retaining member so as to connect the actuating member to the annular wall member,
said aperture being dimensioned to define a clearance between a wall of said aperture and a portion of the actuating member located within said aperture.

2. A turbine according to claim 1, wherein said first bearing surface is contacted by the surface of the retaining member so as to retain the actuating member against the annular wall member.

3. A turbine according to claim 1, wherein said clearance extends in a radial direction relative to said turbine axis.

4. A turbine according to claim 1, wherein said first bearing surface faces away from said annular wall member.

5. A turbine according to claim 1, wherein said terminal portion defines a second bearing surface opposite to said first bearing surface, said second bearing surface configured to contact said annular wall member.

6. A turbine according to claim 1, wherein said terminal portion of the actuating member defines a third bearing surface extending substantially parallel to a diameter of said turbine shaft, said third bearing surface being configured to contact a complementary bearing surface defined by the retaining member.

7. A turbine according to claim 6, wherein said third bearing surface extends substantially parallel to said turbine axis.

8. A turbine according to claim 1, wherein said terminal portion of the actuating member defines a second radially extending flange, said second radially extending flange defining a radial bearing surface facing towards said annular wall member which contacts a complementary bearing surface defined by the retaining member which faces away from said annular wall member.

9. A turbine according to claim 1, wherein a further wall of said aperture defines a bearing surface extending substantially parallel to a diameter of said turbine shaft which is configured to contact a complementary fourth bearing surface defined by the portion of the actuating member located within the aperture.

10. A turbine according to claim 1, wherein the aperture defined by the retaining member is at least partially bounded by the surface of the retaining member which contacts the first bearing surface of the actuating member.

11. A turbine according to claim 10, wherein said aperture is completely bounded by said surface of the retaining member.

12. A turbine according to claim 10, wherein said aperture is partially bounded by said surface of the retaining member such that the aperture forms part of a slot.

13. A turbine according to claim 12, wherein said slot extends substantially parallel to a diameter of said turbine shaft.

14. A turbine according to claim 12, wherein said slot defines a first portion which extends over an arc having a curvature that substantially matches the curvature of the annular wall member.

15. A turbine according to claim 14, wherein said slot further defines a second portion which extends substantially parallel to a diameter of said turbine shaft.

16. A turbine according to claim 15, wherein the portion of the actuating member that is located within said aperture resides within said second portion of the slot.

17. A turbine according to claim 1, wherein the surface of the retaining member which contacts the first bearing surface of the actuating member extends transverse to said turbine axis.

18. A turbine according to claim 1, wherein the surface of the retaining member which contacts the first bearing surface of the actuating member, and said first bearing surface are complementary.

19. A turbine according to claim 1, wherein said retaining member defines an arcuate plate having a curvature that substantially matches the curvature of the annular wall member.

20. A turbine according to claim 1, wherein said retaining member defines at least one bore for receipt of a fastener to secure a contact surface of the retaining member to the annular wall member.

21. A turbine according to claim 20, wherein said retaining member defines first and second of said bores, the first bore defined by a first contacting surface provided on one side of the aperture and the second bore defined by a second contacting surface provided on the opposite side of the aperture.

22. A turbine according to claim 1, wherein said retaining member is a substantially annular plate attached to axially extending radially inner and outer flanges defined by the annular wall member.

* * * * *